United States Patent [19]

Okuda

[11] Patent Number: 4,975,478

[45] Date of Patent: Dec. 4, 1990

[54] WEATHER-RESISTANT POLYACETAL RESIN COMPOSITION AND MOLDED ARTICLES THEREFROM

[75] Inventor: Sadatsugu Okuda, Shizuoka, Japan

[73] Assignee: Polyplastics Co., Ltd., Osaka, Japan

[21] Appl. No.: 388,799

[22] Filed: Aug. 3, 1989

[30] Foreign Application Priority Data

Aug. 22, 1988 [JP] Japan .................................. 63-207539

[51] Int. Cl.$^5$ ................................................. C08K 5/34
[52] U.S. Cl. ........................................ 524/86; 524/91;
524/99; 524/100; 524/102; 524/560; 524/562;
525/64; 525/295; 525/307; 525/327.6;
525/331.9; 525/332.8; 525/333.1; 525/333.3;
525/142
[58] Field of Search ...................... 524/86, 91, 99, 100,
524/102, 560, 562; 525/64, 295, 307, 142, 327.6,
331.9, 332.8, 333.1, 333.3

[56] References Cited

U.S. PATENT DOCUMENTS

| | | | |
|---|---|---|---|
| 4,315,848 | 2/1982 | Dexter et al. | 524/91 |
| 4,528,311 | 7/1985 | Beard et al. | 524/91 |
| 4,716,234 | 12/1987 | Dunks et al. | 548/259 |
| 4,755,546 | 7/1988 | Hechenbleikner et al. | 524/117 |
| 4,804,717 | 2/1989 | Ramey et al. | 525/375 |
| 4,839,405 | 6/1989 | Speelman et al. | 524/99 |
| 4,861,813 | 8/1989 | Seltzer et al. | 524/91 |

Primary Examiner—John Kight, III
Assistant Examiner—S. A. Acquah
Attorney, Agent, or Firm—Nixon & Vanderhye

[57] ABSTRACT

The weather and UV-light resistance of polyacetal resin compositions is improved by incorporating into polyacetal resin a stabilizing package comprised of at least one stabilizing agent selected from benzotriazoles, benzophenones, aromatic benzoates, cyanoacrylates, oxalanilides, and hindered amines, and an acylate resin selected from homopolymers or copolymers of acrylic or methacrylic acid, and ester derivatives thereof.

6 Claims, No Drawings

WEATHER-RESISTANT POLYACETAL RESIN COMPOSITION AND MOLDED ARTICLES THEREFROM

FIELD OF INVENTION

The present invention relates to polyacetal resin compositions exhibiting improved resistance to weathering and UV-light degradation. In particular, the present invention is embodied in a UV-light stabilized polyacetal resin composition having excellent weather resistance which includes a stabilizing package comprised of a weather/light stabilizing agent and an acrylate resin. The present invention also relates to molded articles comprised of the present polyacetal resin composition.

BACKGROUND AND SUMMARY OF THE INVENTION

As is well known, polyacetal resins are conventionally employed in various end-use applications as engineering plastics due to their excellent physical properties, such as mechanical and electrical properties as well as their chemical and heat resistance properties. However, new end-use applications for polyacetal resins demand further property improvements.

For example, further improvement in the weather resistance of the polyacetal resin is required in some situations. In particular, conventional polyacetal resin used to form exterior parts of automobiles and components of electric and office appliances sometimes exhibit discoloration, surface smoothness deterioration (resulting in a reduction of the surface gloss), and/or crack formation on the surface of such parts when exposed to ambient conditions in their intended environment of use (e.g. solar (UV) light, rain, fluorescent lamps, and/or air). These deleterious effects not only impair the appearance of molded parts, but also adversely cause deterioration of the parts' mechanical properties.

It has been proposed to incorporate various stabilizers in polyacetal resins so as to improve their weather and/or UV-light resistance properties and thus overcome the above-noted effects. However, although some improved effects can be obtained by prior stabilization proposals, the surface conditions (e.g. cracks, reduced gloss, etc.) and the mechanical properties of molded polyacetal articles after being exposed to solar rays (ultraviolet rays), rain, and like outdoor elements are not always satisfactory. Thus further improvement in the weather/light resistance of polyacetal resin is needed.

A mere increase in the amount of the stabilizing agent in order to satisfy such a requirement only improves to a limited extent the weather/light resistance properties of polyacetal resin. In addition, increasing the amount of the stabilizing agent may impair the mechanical properties (such as tensile strength and bending strength of the polyacetal resin). Furthermore, stabilizing agents tend to form mold deposits during molding thereby reducing the dimensional accuracy and/or impairing the appearance of molded articles (not to mention the additional time needed to clean the mold) thereby reducing the efficiency of the molding operation. Another problem with conventional stabilizing agents is their tendency to "bleed" on the surfaces of molded articles thereby deleteriously affecting the articles' visual appearance.

According to the present invention, weather stabilized polyacetal molding compositions are provided having a major amount of a polyacetal resin, and a weather stabilizing effective amount of a stabilizing system which includes (i) at least one weather/light stabilizing agent, and (ii) an acrylate resin.

More specifically, according to the present invention, a weather-resistant polyacetal resin composition is comprised of (A) a polyacetal resin, (B) between about 0.01 to about 5 wt. %, based on the total weight of the composition, of a stabilizing agent and (C) between about 1 to 40 wt. %, based on the total weight of the composition, of an acrylate resin.

DETAILED DESCRIPTION OF THE PREFERRED EMBODIMENTS

The polyacetal resin component (A) used in the present invention is a polymeric compound comprising oxymethylene groups ($-CH_2O-$) as the principal units in the polymer chain. Any polyoxymethylene homopolymer, copolymer, terpolymer and/or block copolymer containing a small amount of other constituent units in addition to the oxymethylene groups may satisfactorily be employed. The polyacetal resin component (a) may have either a linear structure, or a branched or crosslinked structure. The degree of polymerization of the polyacetal resin component (a) is not particularly limited.

The preferred stabilizing agents usable as component (B) in the present invention, include one or more compounds selected from the group consisting of (1) benzotriazoles, (2) benzophenones, (3) aromatic benzoates, (4) cyanoacrylates, (5) oxalanilides and (6) hindered amines.

Examples of such stabilizing agents include
(1) benzotriazoles:
  2-(2'-hydroxy-5'-methylphenyl) benzotriazole,
  2-(2'-hydroxy-3',5'-di-t-butylphenyl) benzotriazole,
  2-(3,5-di-t-amyl-2-hydroxyphenyl) benzotriazole,
  2-(2'-hydroxy-3',5'-diisoamylphenyl) benzotriazole,
  2-[2-hydroxy-3,5-bis($\alpha,\alpha$-dimethylbenzyl)phenyl]-benzotriazole and
  2-(2'-hydroxy-4'-octoxyphenyl)benzotriazole
(2) benzophenones:
  2,4-dihydroxybenzophenone,
  2-hydroxy-4-methoxybenzophenone,
  2-hydroxy-4-octoxybenzophenone,
  2-hydroxy-4-dodecyloxybenzophenone,
  2,2'-dimethoxybenzophenone,
  2-hydroxy-4-methoxy-5-sulfobenzophenone and
  2-hydroxy-4-oxybenzylbenzophenone,
(3) aromatic benzoates:
  p-t-butylphenyl salicylate and p-octylphenyl salicylate,
(4) cyanoacrylates:
  2-ethylhexyl,
  2-cyano-3,3'-diphenyl-acrylate and ethyl 2-cyano-3,3'-diphenylacrylate, and
(5) oxalanilides:
  N-(2-ethylphenyl)-N'-(2-ethoxy-5-t-butylphenyl)oxalamide and
  N-(2-ethylphenyl)-N'-(2-ethoxyphenyl) oxalamide.

The hindered amines (6) usable herein are piperidine derivatives having a sterically hindered group, such as
  4-acetoxy-2,2,6,6-tetramethylpiperidine,
  4-stearoyloxy-2,2,6,6-tetramethylpiperidine,
  4-acryloyloxy-2,2,6,6-tetramethylpiperidine,
  4-methoxy-2,2,6,6-tetramethylpiperidine,
  4-benzoyloxy-2,2,6,6-tetramethylpiperidine, 4-cyclohexyloxy-2,2,6,6-tetramethylpiperidine,
4-phenoxy-2,2,6,6-tetramethylpiperidine,
4-benzyloxy-2,2,6,6-tetramethylpiperidine,
4-(phenylcarbamoyloxy)-2,2,6,6-tetramethylpiperidine,
bis(2,2,6,6-tetramethyl-4-piperidyl) oxalate,
bis(2,2,6,6-tetramethyl-4-piperidyl) malonate,
bis(2,2,6,6-tetramethyl-4-piperidyl) adipate,
bis(2,2,6,6-tetramethyl-4-piperidyl) sebacate,
bis(1,2,2,6,6-pentamethylpiperidyl) sebacate,
bis(2,2,6,6-tetramethyl-4-piperidyl) terephthalate,
1,2-bis(2,2,6,6-tetramethyl-4-piperidyloxy) ethane,
bis(2,2,6,6-tetramethyl-4-piperidyl) hexamethylene-1,6-dicarbamate, bis (1-methyl-2,2,6,6-tetramethyl-4-piperidyl) adipate and tris(2,2,6,6-tetramethyl-4-piperidyl) benzene-1,3,5-tricarboxylate.

High molecular piperidine derivative polycondensates such as dimethyl succinate/1-(2-hydroxyethyl)-4-hydroxy-2,2,6,6-tetramethylpiperidine polycondensate are also usable.

The above-noted stabilizing agent is used alone or preferably in combinations of two or more. Particularly, a combination of one or more of the weather stabilizers (1) to (5) with a hindered amine (6) is preferred.

The stabilizing agent is preferably used in an amount of between about 0.01 to about 5 wt. %, particularly about 0.02 to about 3 wt. %, based on the total weight of the composition. When the stabilizing agent is present in insufficient amounts, its beneficial effect cannot be obtained. On the other hand, an excess amount of the stabilizing agent is economically disadvantageous, impairs the mechanical properties of the resin, and causes mold deposits.

The present invention is particularly characterized in that the stabilizing agent (B) and the acrylate resin component (C) are incorporated as a stabilizing package in the polyacetal resin component (A).

The acrylate resins usable in the present invention include homopolymers of acrylic acid, and its ester derivatives (such as methyl acrylate, ethyl acrylate, n-propyl acrylate, isopropyl acrylate, n-butyl acrylate, n-hexyl acrylate and n-octyl acrylate), methacrylic acid and its ester derivatives (such as methyl methacrylate, ethyl methacrylate, n-propyl methacrylate, isopropyl methacrylate, n-butyl methacrylate, isobutyl methacrylate, n-amyl methacrylate and n-octyl methacrylate); and copolymers of acrylic acid methacrylate acid with a comonomer, such as, for example, styrene, acrylonitrile, butadiene or isoprene. Methyl methacrylate homopolymer and copolymers comprising methyl methacrylate as the main component and an acrylic ester, methacrylic ester (other than methyl methacrylate), acrylic acid, methacrylic acid, styrene or acrylonitrile are preferably used.

The amount of the acrylate resin component (C) used herein is preferably between about 1 to about 40 wt. %, particularly between about 3 to 20 wt. %, based on the total composition weight. When the amount of the acrylate resin component (C) is insufficient, the beneficial weather and light resistance effects (particularly prevention of crack formation on surfaces of molded articles) cannot be obtained. On the other hand, when the amount the acrylate resin component (C) is excessive, a deleterious influence on the mechanical properties and the thermal stability of the resin is obtained.

When the acrylate resin component (C) is used in combination with the stabilizing agent (B), the weather and UV-light properties of polyacetal resin are synergistically increased.

It is usually desirable to add other known stabilizers to the composition of the present invention to further increase its thermal stability, etc. For this purpose, known antioxidants, nitrogen compounds, and alkali and alkaline earth metal compounds are preferably used either alone or in combinations of two or more such components.

The compositions of the present invention can be colored with a desired coloring agent by suitably adding carbon black, dye or pigment.

The combination of the stabilizing agent with the acrylate resin according to the present invention is not only effective in imparting improved weather resistance to the resin material per se, but also is quite effective in preventing discoloration of the dyes and/or pigments added to the resin. Thus, the present invention is quite effective in maintaining the appearance and quality of colored polyacetal resin products.

The combination of the stabilizing agent and carbon black is also effective in further improving the weather/light stability of the polyacetal resin.

The compositions of the present invention may further contain other known additives conventionally used in engineering resins to obtain desired properties. These optional additives include, for example, lubricants, nucleating agents, mold release agents, antistatic agents, surfactants, organic polymeric materials, and inorganic or organic, fibrous, granular or platy fillers. These additives can be used either alone or in combinations of two or more.

The compositions of the present invention can be produced by known processing techniques using known apparatus ordinarily employed in the production of synthetic resin compositions. For example, the necessary components can be premixed, with the mixture subsequently being kneaded and extruded via a single-screw or twin-screw extruder to form pellets. The pellets may then be molded to form the moldings. The preparation of the resin compositions can be performed simultaneously with the molding of articles from the compositions by means of a molding machine. Alternatively, a portion, or the entirety of the resin components may be pulverized in order to facilitate their dispersion or mixing, with the components subsequently being mixed and melt-extruded to form pellets.

The stabilizing agent and the other additives may be incorporated into the resin in any step of the process. As a matter of course, however, they are usually added immediately before the production of molded articles, i.e. the final product.

The resin compositions of the present invention can be molded by any molding process conventional in the plastics-forming art, for example, extrusion, injection, compression, vacuum, blow and foam molding processes.

The compositions of the present invention comprising a polyacetal resin containing a stabilizing agent and a specified acrylate resin incorporated therein exhibit significantly improved effects on their surface conditions (particularly significantly increased crack formation time) in addition to exhibiting less reduction in tensile strength when exposed to ultraviolet light or water for prolonged time periods as compared to conventional acrylic resin-free polyacetal compositions.

Therefore, the weather-resistant polyacetal resin compositions of the present invention may suitably be used to form molded parts for end-use applications demanding excellent weather/light resistance. In particular, the compositions of this exposed to solar (UV) rays, rain and air for prolonged time periods, such as exterior parts for automobiles (for example, outer door handles, fuel lids, wheel covers, front fenders and spoilers), electric appliances, cameras, other industrial parts, construction materials, pipes, sundries and household goods.

The following nonlimiting Examples will further illustrate the present invention.

EXAMPLES

In the following Examples, the characteristic values, such as weather resistance, were determined by the following methods:

(1) Crack formation time:

Test pieces were irradiated with ultraviolet rays with a weather meter (WBL-SUN-HCH; a product of Suga Shikenki Co., Ltd.) having a rain spray at 63° C. The surfaces of the test pieces were observed with a magnifying lens at 10x magnification to confirm the crack formation. The crack formation time was the time at which crack formation began, and thus higher the time entry, the better the weather resistance.

(2) Changes in surface conditions:

Test pieces were irradiated with ultraviolet rays with the same weather meter as that described above for a predetermined period of time. Changes in the hue and gloss of the test pieces after irradiation were observed. The extent of the changes was classified into five groups, with the smaller numbers corresponding to lesser changes (i.e. lesser gloss impairment and discoloration), and vice-versa.

(3) Tensile strength:

The tensile strengths of the test pieces were determined by conventional methology (ASTM-D 638) before irradiation with the light of the weather meter and after the irradiation for a predetermined period of time.

Examples 1 to 12 and Comparative Examples 1 to 11

A weather (light) stabilizer (B) and an acrylate resin (methyl methacrylate resin) (C) were added to a polyacetal resin (A) (trade name: Duracon M 90; a product of Polyplastics Co., Ltd.) as shown in Table 1 to obtain a mixture. The mixture was melt-kneaded with a 30 mm double-screw extruder to produce a composition in pellet form. The pellets were then molded into test pieces with an injection molding machine. The weather resistance and other characteristics were determined as above described. For comparison, the same procedure as above was repeated except that the weather (light) stabilizer (B) or the acrylate resin (C) were each used alone. The results appear in Table 1 below.

TABLE 1

| No. | (A) Polyacetal resin (wt. %) | (B) Weather (light stabilizer) Note 1 (wt. %) | (B) Weather (light stabilizer) Note 2 (wt. %) | (C) Acrylic resin Note 3 (wt. %) | Carbon black (wt. %) | Crack formation time (h) | Surface condition after irradiation for: 300 h | Surface condition after irradiation for: 600 h | Surface condition after irradiation for: 1000 h | Tensile strength (kg/cm$^2$) Before irradiation | Tensile strength (kg/cm$^2$) after irradiation for: 600 h | Tensile strength (kg/cm$^2$) after irradiation for: 1000 h | Tensile strength (kg/cm$^2$) after irradiation for: 2000 h |
|---|---|---|---|---|---|---|---|---|---|---|---|---|---|
| Example | | | | | | | | | | | | | |
| 1 | 89.5 | B-1 (0.5) | — | C-1 (10) | — | 380 | 1 | 2 | 5 | 645 | 635 | 580 | 480 |
| 2 | 89.5 | B-1 (0.5) | — | C-2 (10) | — | 400 | 1 | 2 | 5 | 640 | 630 | 570 | 475 |
| 3 | 89.5 | B-1 (0.5) | — | C-3 (10) | — | 400 | 1 | 2 | 5 | 643 | 640 | 574 | 471 |
| 4 | 89.5 | B-2 (0.5) | — | C-2 (10) | — | 380 | 1 | 2 | 5 | 638 | 635 | 573 | 450 |
| 5 | 89.5 | B-3 (0.5) | — | C-2 (10) | — | 420 | 1 | 2 | 5 | 640 | 636 | 560 | 455 |
| 6 | 89.5 | — | B-4 (0.5) | C-2 (10) | — | 380 | 1 | 2 | 5 | 643 | 640 | 570 | 465 |
| 7 | 89.5 | — | B-5 (0.5) | C-2 (10) | — | 380 | 1 | 2 | 5 | 640 | 638 | 568 | 470 |
| 8 | 94.5 | B-1 (0.5) | — | C-2 (5) | — | 350 | 1 | 2 | 5 | 635 | 625 | 570 | 445 |
| 9 | 79.5 | B-1 (0.5) | — | C-2 (20) | — | 440 | 1 | 2 | 4 | 650 | 655 | 600 | 460 |
| 10 | 89.5 | B-3 (0.25) | B-5 (0.25) | C-2 (10) | — | 580 | 1 | 2 | 4 | 642 | 640 | 601 | 510 |
| 11 | 89.5 | B-1 (0.25) | B-4 (0.25) | C-2 (10) | — | 600 | 1 | 2 | 3 | 644 | 641 | 605 | 505 |
| 12 | 89.0 | B-1 (0.25) | B-4 (0.25) | C-2 (10) | (0.5) | 1150 | 1 | 1 | 2 | 648 | 650 | 640 | 613 |
| Comparative Example | | | | | | | | | | | | | |
| 1 | 99.5 | B-1 (0.5) | — | — | — | 280 | 2 | 3 | 5 | 625 | 610 | 520 | 350 |
| 2 | 99.5 | B-2 (0.5) | — | — | — | 260 | 3 | 4 | 5 | 628 | 600 | 510 | 360 |
| 3 | 99.5 | B-3 (0.5) | — | — | — | 300 | 2 | 3 | 5 | 628 | 595 | 508 | 340 |
| 4 | 99.5 | — | B-4 (0.5) | — | — | 240 | 3 | 4 | 5 | 630 | 605 | 522 | 338 |
| 5 | 99.5 | — | B-5 (0.5) | — | — | 280 | 2 | 3 | 5 | 626 | 590 | 513 | 340 |
| 6 | 99.5 | B-3 (0.25) | B-5 (0.25) | — | — | 380 | 1 | 2 | 5 | 630 | 620 | 550 | 420 |
| 7 | 99.5 | B-1 (0.25) | B-4 (0.25) | — | — | 400 | 1 | 2 | 5 | 627 | 619 | 540 | 410 |
| 8 | 99.0 | B-1 (0.25) | B-4 (0.25) | — | (0.5) | 880 | 1 | 2 | 4 | 633 | 635 | 610 | 560 |
| 9 | 90.0 | — | — | C-1 (10) | — | 100 | 4 | 5 | 5 | 650 | 600 | 483 | immeasurable |
| 10 | 90.0 | — | — | C-2 (10) | — | 140 | 4 | 5 | 5 | 648 | 603 | 500 | immeasurable |
| 11 | 90.0 | — | — | C-3 (10) | — | 160 | 4 | 4 | 5 | 645 | 598 | 470 | immeasurable |

Note 1
B-1: 2-(3,5-di-t-amyl-2-hydroxyphenyl)benzotriazole
B-2: 2-[2-hydroxy-3,5-bis(α,α-dimethylbenzyl)phenyl]benzotriazole
B-3: 2-hydroxy-4-oxybenzylbenzophenone
Note 2
B-4: bis(2,2,6,6-tetramethyl-4-piperidyl) sebacate
B-5: dimethyl succinate / 1-(2-hydroxyethyl)-4-hydroxy-2,2,6,6-tetramethylpiperidine polycondensate
Note 3
C-1: methyl methacrylate resin (average molecular weight: 200,000)
C-2: methyl methacrylate resin (average molecular weight: 50,000)
C-3: methyl methacrylate resin (average molecular weight: 7,000)

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A weather stabilized polyacetal molding composition comprising a blend of a major amount of a polyacetal resin, and a weather stabilizing effective amount of a stabilizing system which consists essentially of (i) between about 1 to about 40 percent by weight, based upon the total weight of the composition of benzotriazoles, benzophenones, aromatic benzoates, cyanoacrylates, oxalanilides, and hindered amines, and (ii) between about 3 to about 20 percent by weight, based on the total composition weight, of a homopolymer or copolymer derived from acrylic acid or methacrylic acid, and ester derivatives thereof.

2. A stabilized polyacetal molding composition as in claim 1, wherein said stabilizing system includes as component (ii) a copolymer of acrylic acid or methacrylic acid with at least one comonomer selected from styrene, acrylonitrile, butadiene, and ioprene.

3. A stabilized polyacetal molding composition as in claim 2, wherein said component (ii) is a homopolymer or copolymer of methyl methacrylate.

4. A stabilized composition as in claim 1, wherein component (i) is present in an amount between about 0.01 to about 5 percent by weight based upon the total weight of the composition.

5. A stabilized composition as in claim 1, wherein component (i) is present in an amount between about 0.02 to about 3 percent by weight based upon the total weight of the composition.

6. Molded articles comprising the molding composition of claim 1 or 2.

* * * * *